UNITED STATES PATENT OFFICE.

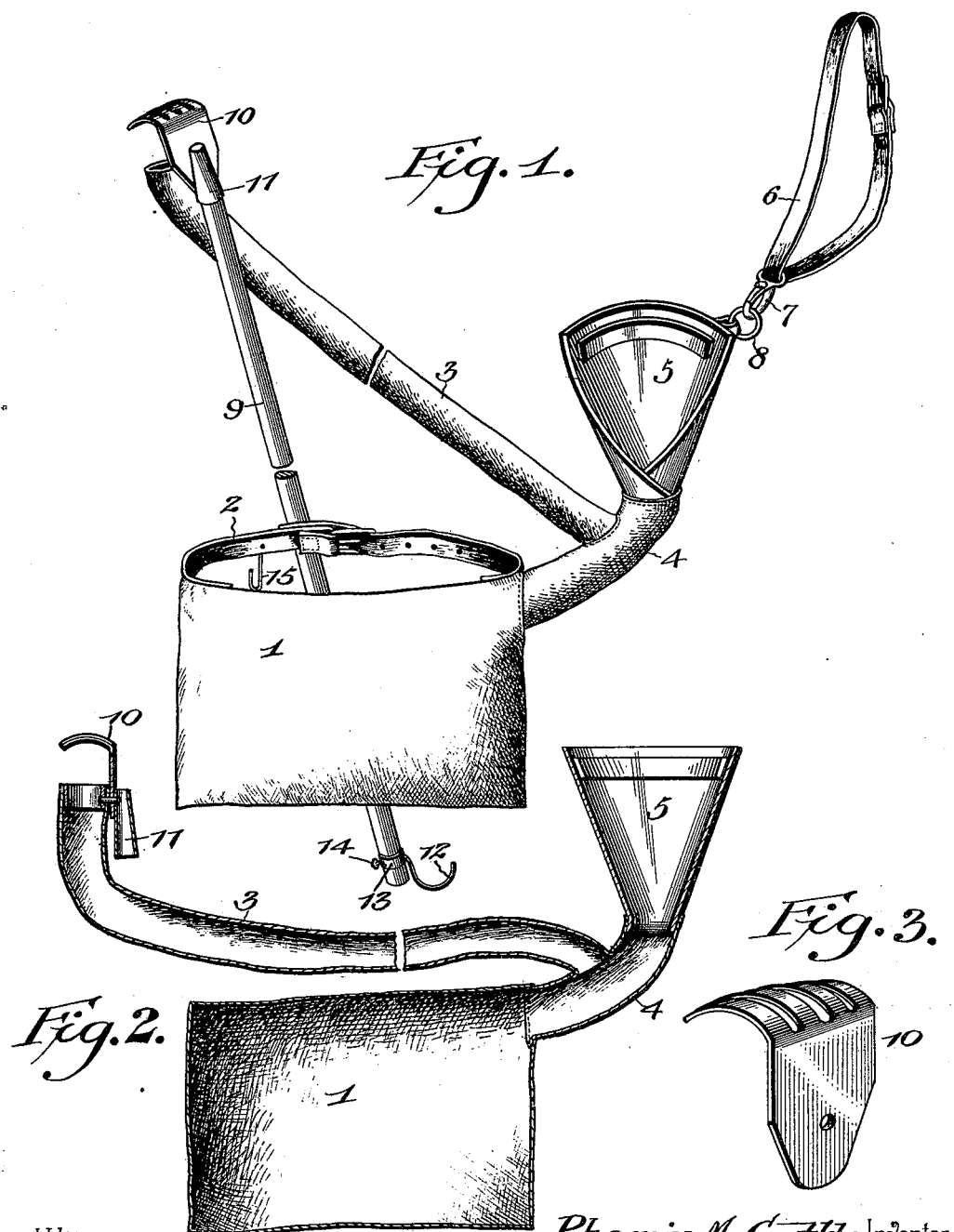

PHOENIX MOSES GUTLEBER, OF LIBERTY CORNER, NEW JERSEY.

FRUIT-GATHERER.

SPECIFICATION forming part of Letters Patent No. 635,316, dated October 24, 1899.

Application filed November 9, 1898. Serial No. 695,963. (No model.)

*To all whom it may concern:*

Be it known that I, PHOENIX MOSES GUTLEBER, a citizen of the United States, residing at Liberty Corner, in the county of Somerset and State of New Jersey, have invented a new and useful Fruit-Gatherer, of which the following is a specification.

The invention relates to improvements in fruit-gatherers.

The object of the present invention is to improve the construction of fruit-gatherers and to provide a simple and comparatively inexpensive one adapted to enable fruit to be rapidly gathered without bruising or otherwise injuring the same and capable of enabling the operator to reach high fruit and to draw the limbs downward within easy reach, so that the fruit may be rapidly picked by hand.

Another object of the invention is to provide a receptacle for fruit and to enable the latter, whether picked by hand or by the fruit-gatherer, to be conveniently deposited in the receptacle.

The invention consists in the construction and novel combination and arrangement of parts, as hereinafter fully described, illustrated in the accompanying drawings, and pointed out in the claims hereto appended.

In the drawings, Figure 1 is a perspective view of a fruit-gatherer constructed in accordance with this invention. Fig. 2 is a longitudinal sectional view. Fig. 3 is a detail view of the fruit-engaging head.

Like numerals of reference designate corresponding parts in all the figures of the drawings.

1 designates a bag forming a receptacle for fruit and designed to be attached to an operator by means of a belt or strap 2, having a buckle or other suitable means for adjusting it to the wearer. Communicating with the bag or receptacle 1 are chutes 3 and 4, which are connected at their lower ends and communicate with the bag or receptacle through a single opening. The chutes 3 and 4, which are constructed of fabric or other suitable material, diverge, as shown, and the chute 4, which is shorter than the chute 3, is designed to be arranged at the breast of the operator and is provided with a flaring mouth 5, of leather or other suitable material, adapted to hold the chute distended, so that fruit may be conveniently deposited into the same. This chute 4 is designed to receive fruit picked by the hand of the operator, and it is supported by means of a shoulder-strap 6, designed to extend over one of the shoulders and under the opposite arm of the wearer. The mouth 5 of the chute 4 is provided with an eye or ring, and the strap 6 is provided with a snap-hook 7, adapted to engage the eye or ring 8 of the chute 4.

The long chute 3, which is supported by a pole 9, has its mouth stiffened, and it is provided with a tapering sleeve or socket 11 for the reception of the pole 9, and it has a head 10, consisting of a plate having a curved top portion arranged substantially at right angles to the other portion, the head being substantially L-shaped. The head 10, which has its top portion curved over the mouth of the long chute 3, is provided with a series of parallel openings or slots which divide the curved portion into a series of hooks adapted to engage the fruit and cause the same to fall into the chute 3. The upper end of the rod or pole 9 is tapered to fit the sleeve or ferrule, and it is adapted to be readily removed from the same and to be inverted to engage a hook 12 with a limb to enable the operator to pull the latter downward within reach, so that the fruit may be rapidly picked by hand. The hook 12 is provided with a band or collar 13, which is secured to the pole by a clamping-screw 14. When the long chute is not in use, it is supported by a hook 15 of the strap 2, and it may be readily hung thereon.

The invention has the following advantages: The fruit-gatherer, which is simple and inexpensive in construction, is conveniently operated, and it enables fruit to be picked from elevated points on a tree, and it is also capable of permitting the operator to draw limbs downward and pick the fruit by hand. The long and short chutes deliver the fruit to the bag or receptacle, and the short chute is provided with a flaring mouth which is arranged within easy reach. The pole is detachably connected with the long chute, and when the latter is not in use it may be conveniently carried by suspending it from the hook of the strap or belt.

Changes in the form, proportion, and minor details of construction may be resorted to without departing from the spirit or sacrificing any of the advantages of this invention.

What is claimed is—

1. A fruit-gatherer comprising a receptacle having a strap or belt for securing it to the wearer, the short chute having an enlarged flaring mouth and provided with a shoulder-strap adapted to support the mouth of the short chute at the breast of the wearer to receive fruit picked by hand, a long chute having a fruit-picking device, both of said chutes delivering into the receptacle and a pole supporting the long chute, substantially as described.

2. A fruit-gatherer comprising a receptacle provided with a belt having a supporting device, the long and short chutes both delivering into the receptacle, the short chute being provided with means for attaching it to the wearer adjacent to the shoulders, so that fruit may be readily introduced into it by hand, a head mounted on the long chute at the outer end thereof and adapted to engage the fruit and provided with an inverted socket, and a detachable and reversible pole having one end removably fitted in the socket to support the long chute, and provided at its other end with means for engaging the limb of a tree, the said supporting device being adapted to receive the long chute when the pole is detached from the socket, substantially as described.

In testimony that I claim the foregoing as my own I have hereto affixed my signature in the presence of two witnesses.

PHOENIX MOSES GUTLEBER.

Witnesses:
　AUG. VANDERVEER,
　FRANK W. SOMERS.